United States Patent Office

3,637,789
Patented Jan. 25, 1972

3,637,789
PROCESS FOR THE PRODUCTION OF ALKENYL THIOESTERS
Pierre Legendre, Pau, France, assignor to Societe Nationale des Petroles d'Aquitaine, Paris, France
No Drawing. Continuation of application Ser. No. 644,750, May 16, 1967. This application May 8, 1970, Ser. No. 33,175
Claims priority, application France, Apr. 21, 1967, 103,639
Int. Cl. C07c *153/07*
U.S. Cl. 260—455 C                    1 Claim

ABSTRACT OF THE DISCLOSURE

This invention relates to a process for the production of alkenyl thioesters of the general formula $$R_1R_2C=CR_3CHR_4S-CO-R$$

by reacting compounds of the formula R—COSH and a base MOH with a compound of formula $$R_1R_2C=CR_3-CH_4X$$

wherein $R_1$, $R_2$, $R_3$, and $R_4$ are members selected from hydrogen, chlorine, bromine, an alkyl group having 1–6 carbon atoms, and a phenyl group; wherein R represents an alkyl group having 1–6 carbon atoms, an alkenyl group having 1–16 carbon atoms, an aryl group from the group consisting of phenyl, toluyl, and cinnamyl; wherein X is halogen and wherein M represents a cation selected from sodium, potassium, calcium, ammonium, and the amine group of an organic base.

---

This is a continuation of application Ser. No. 644,750, filed May 16, 1967, now abandoned.

Alkenyl thioesters, and particularly chlorinated alkenyl thioacetates, have become highly useful industrial products, especially for the production of tetrahalopropenes; they can also be used as insecticides or fungicides. The known method of preparation consists, in the case of non-halogenated alkenyl thioesters, in causing an unsaturated mercaptan, such as an allyl, crotyl, alkylvinyl or other mercaptan, to react with an acid or an organic anhydride, as described in U.S. Pat. No. 2,212,895; this reaction is very slow at normal temperature, although the yields are good, whereas the yields are considerably lowered if one works under heat in order to accelerate the reaction. On the other hand, this method does not seem to have found any application in the manufacture of haloalkenyl thioesters; in this case previous preparation of the halogenated mercaptan would be required and this would complicate the method of manufacture and would make it more costly. It is undoubtedly for these reasons that it has been proposed hitherto to produce haloacyl thioesters by causing an alkali or alkaline earth metal salt or an ammonium salt of an organic thioacid to act on a tetrahalogenated saturated aliphatic hydrocarbon having three halogen atoms attached to the same carbon atom; this process is described in French Patent No. 981,188. Replacement of a halogen by the thiocarboxy group of the acid being used takes place, while a second halogen is eliminated from the molecule, in the corresponding hydracid form, leading to the occurrence of a double bond. The thioester yield is very small; moreover, this process has a restricted field of action, since it applies specifically only to tetrahalogenated alkanes.

It is one object of the present invention to provide an effective process for manufacturing thioesters, and particularly halogenated alkenyl thioesters. It is a further object of the invention to provide a process which will be applicable to the preparation of halogenated alkenyl thioesters having different numbers of carbon atoms and of the desired halogen atoms and which will permit the desired compounds to be obtained with satisfactory yields, while nevertheless starting with readily accessible starting materials.

The process according to the invention consists in causing an organic thioacid to react, in the presence of an equivalent proportion of a base, with a haloalkene containing one or more halogen atoms in the molecule.

The reaction can be illustrated by the equation:

$$R_1R_2C=CR_3-CHR_4X + R-COSH + MOH \rightarrow$$
$$MX + R_1R_2C=CR_3-CHR_4SOCR + H_2O \quad (1)$$

wherein

Each of the symbols $R_1$, $R_2$, $R_3$ and $R_4$, which may represent the same or different radicals, may be a hydrogen or halogen atom, or even an alkyl or aryl radical, such as methyl, ethyl, propyl, isopropyl, butyl, isobutyl or phenyl for example; the alkyl radicals will usually have 1 to 6 carbon atoms;

X is a halogen, and usually chlorine or bromine;

R can be any saturated or unsaturated aliphatic, cyclic, or cycloaliphatic radical capable of forming part of an organic thioacid;

M represents the cation of the base being used, for example Na, K, ½ Ca, $NH_4$ or the amine group of an organic base.

It is possible for the preparation to be effected starting from the corresponding salt R—COSM of the thioacid, instead of from the acid RCOSH and he base MOH taken separately.

The proportions of the reactants are preferably equal to or very close to stoichiometric, that is to say, one equivalent of acid and one equivalent of base, or alternatively one equivalent of the corresponding salt, per mol of haloalkene.

As regards the mono-thioacids or di-thioacids, which can be used in carrying the invention into effect, there may be mentioned by way of non-limitative example, those in which the radical R is an alkyl radical having 1 to 30 carbon atoms, and especially 1 to 6 carbon atoms, such as, for example, thioacetic, thiobutyric, thiosuccinic, thiomaleic and thiostearic acids; unsaturated thioacids, such as thioacrylic, thiocrotonic and thio-oleic acids are also suitable. Aromatic thioacids can be used, such as thiobenzoic, thiotoluic and thiocinnamic acids, for example.

The reaction preferably takes place in a solvent for the reactants which are present, such as, for example, alcohols, ketones, alkyl esters, dioxan and nitrogenated bases such as pyridine.

According to a preferred mode of carrying the invention into effect, the thioacid, the base and the haloalkene are first of all allowed to react, while stirring, without applying external heat and, when the halide MX of the cation of the base has precipitated, the mixture is brought to the boiling temperature of the solvent, for the time necessary to complete the operation, the solvent being refluxed. This time is generally fairly short and may be, in particular, of the order of 10 to 150 minutes.

Thus, one form of the process of the invention which is particularly convenient in practice consists in allowing the reaction (1) to be accomplished first of all, in a solvent at a temperature which is between ambient temperature and about 50° C.; thereafter, when a fairly large quantity of MX salt has precipitated, the mixture is heated to about 70 to 100° C. for 10 to 150 minutes, before separating the thioester which is formed.

The separation of the thioester can be effected in any convenient manner, but is advantageously achieved by extraction with the aid of another solvent, in particular a chlorinated solvent such as chloroform, followed by a distillation after the evaporation of this solvent.

Particularly, favourable results are obtained using monohalo, dihalo, trihalo and tetrahalopropenes, in which the halogen can occupy various positions.

Although the invention is applicable to various thioacids and haloalkenes, as indicated above, one of its applications which is of particular industrial interest uses thioacetic acid and a chloropropene containing 1 to 4 chlorine atoms in its molecule. This application of the invention will be more particularly described with reference to the following examples, without, however, implying any limitation of the scope of the invention which is defined only by the appended claims.

EXAMPLE 1

31 g. of thioacetic acid (0.408 mol $CH_3COSH$) is added to 40 ml. of an aqueous solution containing 22 g. (0.392 mol) of KOH; the product obtained then has added thereto in small fractions, while mixing, 200 ml. of a solution of 53 g. of 1,1,3-trichloropropene (0.364 mol of $$Cl_2C=CH-CH_2Cl)$$

in ethanol.

A heating effect is produced and there is rapid precipitation of KCl. On completing the addition of the ethanolic solution, the reaction mixture is heated to the boiling temperature of ethanol in a container above which is arranged a reflux condenser. After heating for 30 minutes, the mixture is cooled, 500 ml. of water are added and extraction is carried out with chloroform.

The chloroform solution is dried over anhydrous sodium sulphate, after which the chloroform is evaporated; the residue is distilled in vacuo and there are obtained 51 g. of 1,1-dichloropropenyl thioacetate, $$CH_3COS-CH_2-CH=CCl_2$$

with a yield of 75% with respect to the 1,1,3-trichloropropane used.

The thioacetate obtained boils at 80° C./0.7 mm. Hg.

EXAMPLE 2

The same operations are repeated under the same conditions as in Example 1, but this time with the 3,3,3-trichloropropene isomer, $CCl_3-CH=CH_2$, instead of the 1,1,3-isomer; the final heating under reflux lasts 2 hours. The same quantity (51 g.) of final product is obtained, and it is found that this latter is indeed the 1,1-dichloropropenyl thioacetate, as in Example 1. Thus in this case the preparation according to the invention is accompanied by isomerisation, so that same thioacetate is obtained, both when starting with 1,1,3-trichloropropene and with the 3,3,3-trichloroisomer.

EXAMPLE 3

In the procedure described in Example 1, the trichloropropane is replaced by the equivalent quantity (0.364 mole) of allyl chloride $CH_2=CH-CH_2Cl$. Allyl thioacetate $CH_3COS-CH_2-CH=CH_2$ is then obtained, boiling at 55° C./30 mm. Hg, with a yield of 63.2% with respect to the allyl chloride used.

EXAMPLE 4

Still using the procedure of Example 1, 0.364 mol (40.4 g.) of 2,3-dichloropropene $CH_2=CCl-CH_2Cl$ is treated instead of the trichloropropene. The 2-chloro-propenyl thioacetate, $CH_3COS-CH_2-CCl=CH_2$, which is obtained is a new substance. It boils at 41° C./1 mm. Hg and has the following lines in its infrared spectrum (cm.$^{-1}$):

| | | | |
|---|---|---|---|
| 3120 | 1640 | 1130 | 750 |
| 2990 | 1410 | 1100 | 680 |
| 2930 | 1360 | 960 | 620 |
| 1700 | 1210 | 890 | |

It is obtained with a yield of 62%.

EXAMPLE 5

The trichloropropene of Example 1 is replaced by the equivalent quantity of 1-chloro-2-butene.
2-butenyl thioacetate, $$CH_3COS-CH_2-CH=CH-CH_3$$

is obtained with a yield of 40%, based on the starting compound: the said thioacetate boils at 60° C./15 mm. Hg.

EXAMPLE 6

In this method of preparation, which is similar to Example 1, the starting chloroalkene comprises 0.364 mol of 1,3-dichloropropene, which leads to a new substance, 1-chloropropenyl thioacetate, $$CH_3COS-CH_2-CH=CHCl$$

which is obtained with a yield of 64% with respect to the initial dichloropropene.

The thioacetate boils at 86° C./20 mm. Hg.

Its infra-red spectrum shows the following lines (cm.$^{-1}$):

| | | | |
|---|---|---|---|
| 3080 | 1410 | 1130 | 820 |
| 2990 | 1355 | 1100 | 760 |
| 2920 | 1280 | 950 | 690 |
| 1700 | 1270 | 930 | 620 |
| 1630 | 1230 | 880 | |

EXAMPLE 7

1,3-dichloro-butene is employed as the initial chloroalkene, using the procedure of Example 1 (0.364 mol), this resulted in a thioacetate of the formula $$CH_3COS-\underset{\underset{CH_3}{|}}{C}H-CH=CHCl$$

with a yield of 16%.

This new substance boils at 88° C./14 mm. Hg and has the following lines (cm.$^{-1}$) in the infra-red spectrum:

| | | |
|---|---|---|
| 3090 | 1420 (narrow) | 830 |
| 2990 | 1380 | 760 |
| 2940 | 1360 | 740 |
| 2890 | 1130 (wide) | 670 |
| 1700 | 1120 | 630 |
| 1620 | 1020 | |
| 1450 | 950 (wide) | |

EXAMPLE 8

The starting material in this case is 1,2,3-trichloropropene (0.364 mol), the working conditions being the same as in Example 1. In this way there is obtained the new substance:

$$CH_3COS-CH_2-CCl=CHCl$$

which is 1,2-dichloropropenyl thioacetate, which boils at 115° C./60 mm. Hg and the infra-red spectrum of which shows the following lines (cm.$^{-1}$):

| | | | |
|---|---|---|---|
| 3090 | 1620 | 1100 | 740 |
| 2990 | 1420 | 1050 | 700 |
| 2920 | 1360 | 955 | 620 |
| 1700 | 1130 | 815 | |

This product is obtained with a yield of 40%, relatively to the initial trichloropropene.

EXAMPLE 9

In the procedure of Example 1, the initial trichloropropene is replaced by the equivalent quantity (0.364 mol) of 1,1,2,3-tetrachloropropene $CCl_2=CCl-CH_2Cl$.

The process leads to 1,1,2-trichloropropenyl thioacetate:

$$CH_3COS-CH_2-CCl=CCl_2$$

which is a new substance which boils at 110° C./10 mm. Hg; the spectrum of this compound shows the lines:

| | | |
|---|---|---|
| 2980 | 1220 (narrow) | 875 |
| 2920 | 1180 | 750 |
| 1700 | 1120 | 700 |
| 1595 | 1080 | 610 |
| 1410 | 950 | |
| 1350 | 930 | |

This process resulted in a yield of 65.4% with respect to the tetrachloropropene being used.

EXAMPLE 10

145.5 g. of 1,1,3-trichloropropene (1 mol), in solution in 300 g. of pyridine is added progressively, while stirring, to 104 g. of thiobutyric acid (1 mol). The mixture is then heated to 90° C. for one hour, after which it is cooled, diluted with 650 ml. of water and extracted with chloroform, as in Example 1. In this way, there is obtained 1,1-dichloropropenyl thiobutyrate, with a yield of 56% relatively to the trichloropropene used.

I claim:
1. In a process for the manufacture of an alkenyl thioester by the reaction of thioacetic acid, a base selected from the group consisting of sodium hydroxide, potassium hydroxide and pyridine with a stoichiometric amount of a halopropene having 1 to 4 atoms of chlorine in a solvent selected from the group consisting of an alcohol, a ketone, an ester, an ether, dioxane and pyridine without the application of external heat, the improvement which comprises allowing the resultant halide salt to precipitate, heating the reaction medium to about 70 to 100° C. for 10 to 150 minutes, extracting the resultant thioester from the reaction medium with chloroform, evaporating the chloroform and recovering the alkenyl thioester formed thereby.

References Cited

UNITED STATES PATENTS

| 2,212,895 | 8/1940 | Allen | 260—455 C |
| 2,268,382 | 12/1941 | Cloud et al. | 260—455 C |
| 2,396,879 | 3/1946 | Porter et al. | 260—455 C |
| 2,408,094 | 9/1946 | Pavlic | 260—455 C |
| 3,103,464 | 9/1963 | Larson et al. | 424—301 |
| 3,226,417 | 12/1965 | Bikales | 260—455 C |
| 3,404,173 | 10/1968 | Edelson | 260—455 C |
| 3,427,330 | 2/1969 | Karmas | 260—455 C |

FOREIGN PATENTS

| 981,188 | 1/1951 | France | 260—455 C |

OTHER REFERENCES

Oswald et al., Chem. Abstr., vol. 61 (1964), p. 2932.

Oswald et al., "Organic Sulfur Cmpds., etc." (1962), J.A.C.S., 84, pp. 3897–904 (1962).

Reid, "Chemistry of Bivalent Sulfur," vol. 1, IV, p. 29 (1962).

Reid, "Org. Chem. of Bivalent Sulfur," vol. 1, pp. 29–30 (1958), Chem. Pub. Co. Inc., New York, 1958.

LEWIS GOTTS, Primary Examiner

G. HOLLRAH, Assistant Examiner

U.S. Cl. X.R.

260—654; 424—301